INVENTORS
JAN DE KONING
ROMKE VAN DER VEEN
BY
ATTORNEYS

United States Patent Office 3,534,605
Patented Oct. 20, 1970

3,534,605
METHOD AND APPARATUS FOR THE UNDERWATER MEASUREMENT OF THE THICKNESS OF A SILT LAYER
Jan de Koning, Amsterdam, Romke van der Veen, Jutphaas, Netherlands, assignors, by mesne assignments, to N.V. Nestum II, The Hague, Netherlands, a Dutch corporation
Filed Sept. 6, 1968, Ser. No. 757,927
Claims priority, application Netherlands, Sept. 28, 1967, 6713192
Int. Cl. G01f 23/14; G01n 3/30
U.S. Cl. 73—290                3 Claims

ABSTRACT OF THE DISCLOSURE

A first pressure sensing device is moved downwardly first to measure the pressure change at the interface between the water and the top of an underwater silt layer and then the interface between the bottom of the silt layer and the bottom layer material which it overlies. At the same time, a second pressure sensing device is moved with but in spaced relation above the first device, the second device measuring the water pressure and thus giving an indication of the linear movement of the first device. Outputs from the two devices are applied to the X and Y axes of an XY axis recorder so that the thickness of the silt layer may be determined.

---

In rivers and harbors the extent of silting-up is measured from time to time. More particularly in the construction of a tunnel under a river bed by sinking sections of the tunnel into a trench dredged transversely in the river bed it is of great importance to know exactly, or at any rate to within a few centimetres, how much silt from the flowing river has been washed into the trench in the period between the dredging thereof and the sinking of the tunnel sections.

The invention relates to a method and apparatus for the underwater measurement of the thickness of a layer of silt. The thickness of a silt layer is usually measured with the aid of an echo sounder. This method, however, is not reliable, because the echo sounding is difficult to interpret when a layer of silt is present. For this reason it is often necessary, in addition, to employ divers, who can indeed duly ascertain whether or not there is silt present but cannot determine the thickness of a silt layer with sufficient accuracy.

The invention provides a new method which is accurate and reliable by reason of the fact that a carrier which is connected by means of a flexible element to a hoisting device disposed on a vessel, is lowered to the bed the silt layer of which has to be measured, that while a first pressure sensing element secured to the bottom end of the carrier is pushed through the silt layer, the pressure acting upon said first sensing element is measured and by means of a second pressure sensing element secured to the carrier and remaining above the silt layer the depth of the carrier is measured and that the thickness of the silt layer is deduced from the values measured by means of these two sensing elements.

The invention also provides a new apparatus for performing this method, which is characterised by a first pressure sensing element secured to the bottom end of a carrier, a second pressure sensing element which is secured to the same carrier above the first at a vertical distance which is greater than the anticipated thickness of the silt layer, and a flexible element which connects the carrier to a hoisting device disposed on a vessel.

Figure 1:
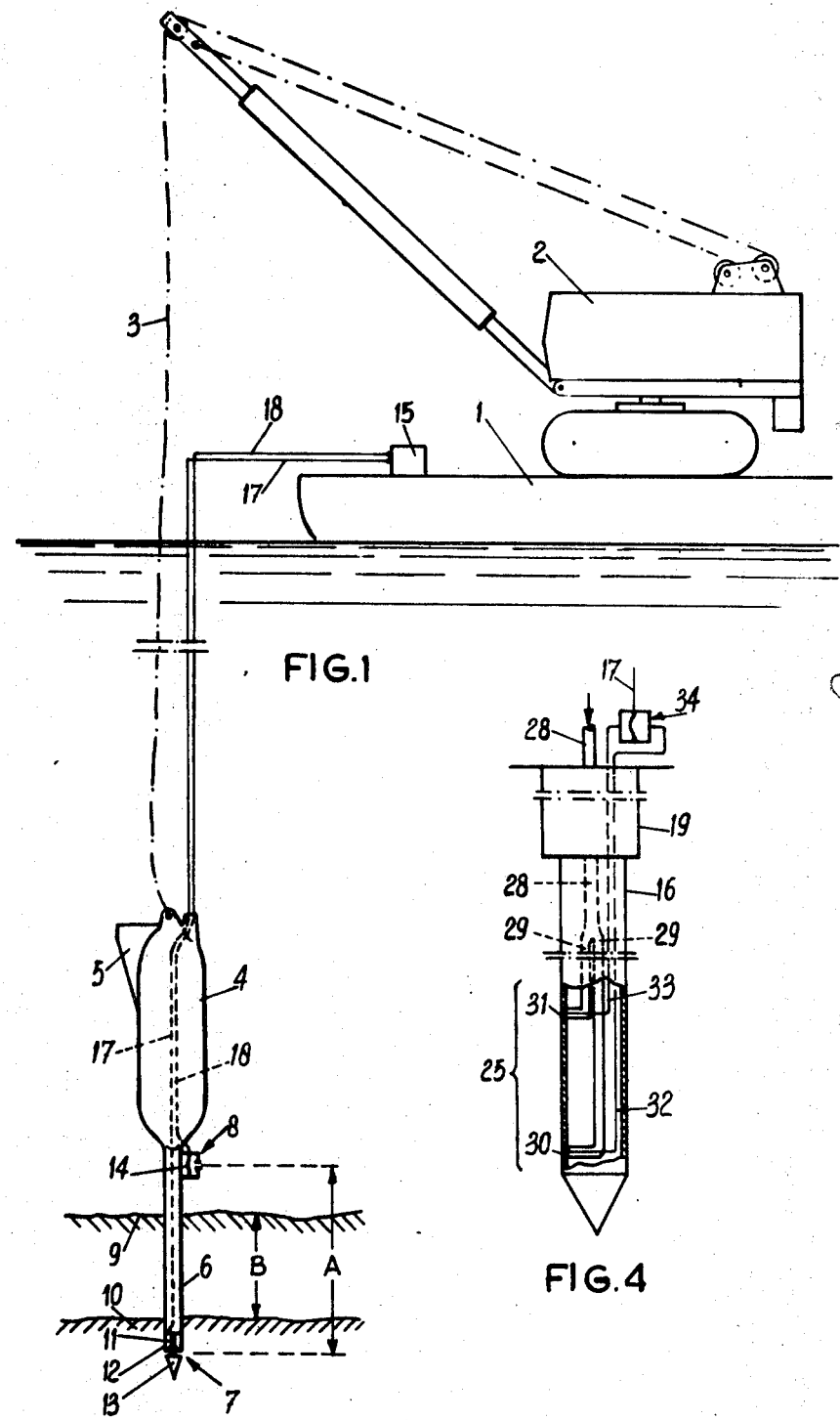
Figure 2:
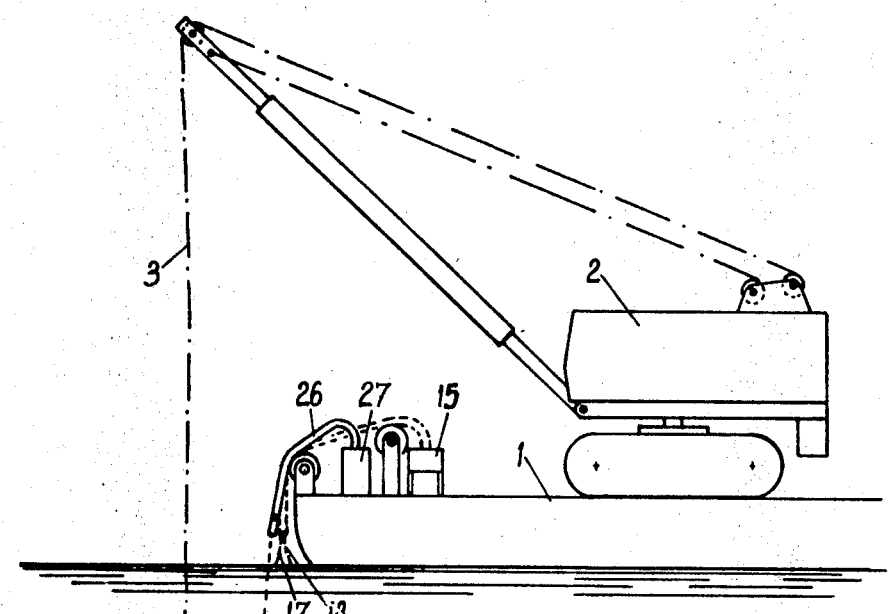
Figure 3:
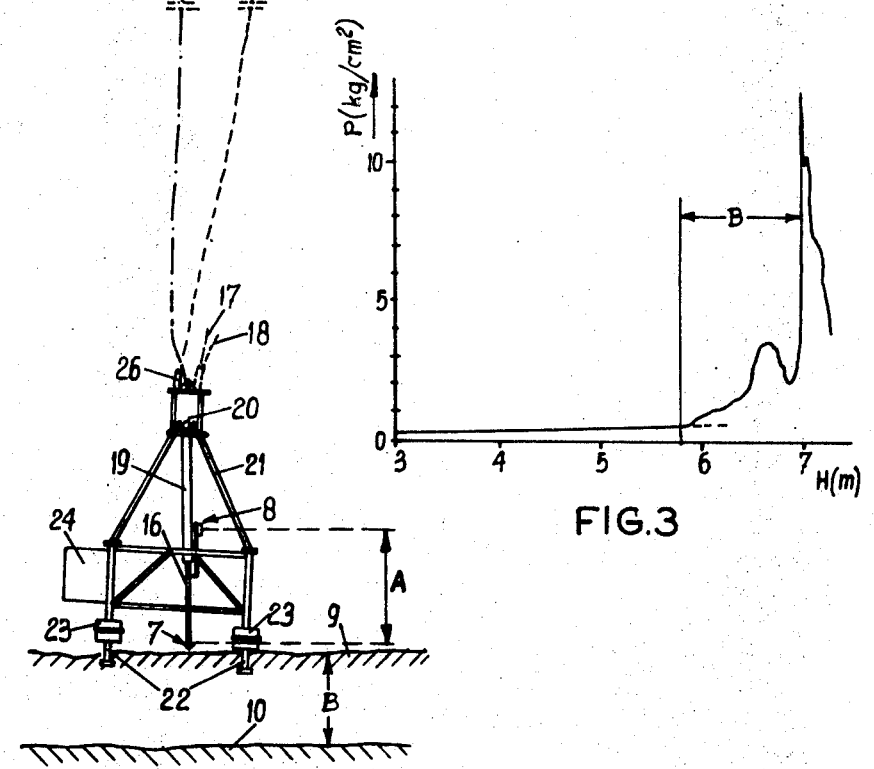

The above and other characteristics of the invention will be explained in the following description of preferred embodiments of the apparatus according to the invention with reference to a drawing, wherein schematically illustrate:

FIG. 1 such an apparatus;
FIG. 2 a further development thereof;
FIG. 3 a graph plotted in performing the method according to the invention; and
FIG. 4 a variant of a detail of such an apparatus.

On a vessel 1 is disposed a hoisting device 2 from which is suspended a carrier 4 with a stabilising fin 5 by means of a cable 3. The carrier 4 weighs, for example, 250 kg. and at the bottom is in the form of a rod 6 which carries a first pressure sensing element 7 at its bottom end and, above this, a second pressure sensing element 8. The vertical distance A between the two pressure sensing elements 7 and 8 is greater than the anticipated thickness B of the silt layer 9 which is to be measured and lies above the sand layer 10.

The pressure sensing element 7 is, for example, a sensing element which is known per se, comprising a pressure rod 11 with affixed strain gauges and extends slidingly and in sealed relationship through the bottom wall of a chamber 12 and has a conical or pyramidal point 13 at the free bottom end. The pressure sensing element 8 is an absolute pressure sensing element which is known per se, comprising, for example, a metal diaphragm 14 whose deflection, which depends upon the pressure outside the sensing element 8, is measured. This pressure sensing element 8 therefore measures the depth at which it is situated, this depth being less than the depth of the sensing element 7 by an amount equal to the known distance A. For measuring the thickness B of the silt layer 9, the cable 3 is gradually paid out until the sensing element 7 is at a small distance from the silt layer 9. Then the cable 3 is fully paid out, so that the carrier 4 falls freely and the rolling of the vessel 1 no longer has any influence on the movement of the carrier 4. During the free fall of the carrier 4 the electric voltages from the second and the first sensing element 8 and 7 are connected by means of electric wires 18 and 17 to the input terminals of, respectively, the X-axis and the Y-axis of an XY-recorder 15. FIG. 3 illustrates a graph recorded in this way, in which the depth H below the surface of the water is given in metres and the pressure P of the first sensing element is given in kg./cm.². At the transition from the straight line to the curve the first pressure sensing element enters the silt layer 9 and at the sudden steep rise of this curve the sensing element enters the sand. Therefore the difference in depth B in FIG. 3 is equal to the thickness of the silt layer 9. In the example illustrated in the drawing, the silt layer 9 comprises a number of layers of different kinds of silt. The carrier 4 of the sensing elements 7 and 8 can be suspended indirectly, instead of directly, from the cable 3 (see FIG. 2). The carrier 16 which carries the first sensing element 7 and the second sensing element 8 is formed by the piston rod of a hydraulic cylinder 19. This cylinder 19 is suspended by means of a universal joint 20 in a frame 21 with three legs 22 which carry weights 23. The frame 21 has a stabilising fin 24. The whole structure weighs, for example, 1000 kg. and is suspended from the cable 3 of a hoisting device 2 disposed on a vessel 1. For measuring the thickness of a silt layer 9 the frame 21 is lowered to the bottom, where the legs 22 sink, for example, to unequal depths into the silt layer 9. In this position the first sensing element 7 is still above the silt layer 9. The cylinder 19 and the carrier 16 are then in the vertical position, while the cable 3 hangs slack. Next, the previously retracted piston rod 16 is thrust downwards, causing the first sensing element 7 to be pushed through the silt layer 9. The measured values are again recorded by the XY-recorder 15. The cylinder 19 is connected by means of two flexible tubes 26 to an oil pressure source 27 disposed on the vessel 1.

Instead of the pressure sensing element 7 shown in FIG. 1, a relative pressure sensing element 25 (see FIG. 4) can be used. In that case, water under pressure is fed from the vessel 1 through a flexible tube 28 and two branches 29 to two outlets 30 and 31 of the relative pressure sensing element 25, which outlets are disposed a short distance (e.g., 5 cm.) one above the other on the side of the rod 6 or of the piston rod 16. Measuring lines 32 and 33 connect the outlets 30 and 31 to the two sides of a pressure difference gauge 34 which is connected by means of an electric lead 17 to the Y-axis of the XY-recorder. The pressure difference gauge 34 measures the pressure difference at the outlets 30 and 31 and thus measures the weight of the column of material which is present between these outlets 30 and 31. Since the specific gravity of silt is substantially higher than that of water and substantially lower than that of sand, it is possible to determine the depth at which the silt layer 9 begins and the depth at which the transition from the silt to the sand layer 10 occurs.

What we claim is:

1. A method of measuring the thickness of a silt layer which has accumulated underwater on top of a bottom layer having a density different from that of the silt layer, which comprises the steps of:
   (a) moving a first pressure sensing device downwardly through the water to pass through the interface between the water and the top of the silt layer, through the silt layer, and through the interface between the bottom of the silt layer and the bottom layer,
   (b) simultaneously with (a), moving a second pressure sensing device downwardly through the water toward, but not into, the silt layer, the movement of the second pressure sensing device being coordinated with the movement of the first pressure sensing device to provide an indication of the linear movement of the first pressure sensing device,
   (c) recording the pressure changes sensed by the first sensing device at the stated interfaces as a function of the linear movement indicated by the second pressure sensing device.

2. Apparatus for the underwater measurement of the thickness of a silt layer which comprises, a carrier, a first pressure sensing element secured to the bottom end of said carrier, a second pressure sensing element secured to said carrier at a predetermined vertical distance above said first pressure sensing element which is greater than the anticipated thickness of the silt layer, means for raising and lowering said carrier and XY-recorder means having its input terminals connected respectively to said pressure sensing elements.

3. Apparatus according to claim 2 in which said means for raising and lowering includes a flexible member, a frame connected to the end of said flexible member, said carrier being mounted on said frame so as to move relative to said frame axially of itself.

References Cited

UNITED STATES PATENTS

| | | | |
|---|---|---|---|
| 2,833,144 | 5/1958 | Miller et al. | 73—84 |
| 3,148,538 | 9/1964 | Heerema | 73—84 |
| 3,329,931 | 7/1967 | Tanguy | 340—18 |

S. CLEMENT SWISHER, Primary Examiner

H. C. POST III, Assistant Examiner

U.S. Cl. X.R.

73—84, 170, 299